(12) United States Patent
Cafferty et al.

(10) Patent No.: US 7,267,381 B2
(45) Date of Patent: Sep. 11, 2007

(54) DOG WASTE-COLLECTION DEVICE AND BAG DISPOSAL SYSTEM

(76) Inventors: William Norman Cafferty, 219 GAF Lake Rd., Windsor, NY (US) 13865; Joseph Peter Cafferty, 219 GAF Lake Rd., Windsor, NY (US) 13865

( * ) Notice: Subject to any disclaimer, the term of this patent is extended or adjusted under 35 U.S.C. 154(b) by 0 days.

(21) Appl. No.: 11/034,813

(22) Filed: Jan. 14, 2005

(65) Prior Publication Data
US 2006/0157995 A1    Jul. 20, 2006

(51) Int. Cl.
*A01K 29/00* (2006.01)
*E01H 1/12* (2006.01)

(52) U.S. Cl. ............................................ 294/1.5

(58) Field of Classification Search ............... 294/1.1, 294/1.3, 1.4, 1.5, 55; 248/99; 15/257.1, 15/257; 383/1
See application file for complete search history.

(56) References Cited

U.S. PATENT DOCUMENTS

| | | | |
|---|---|---|---|
| 3,744,453 A | 7/1973 | Deitch | |
| 3,872,831 A | 3/1975 | Cassidy | |
| 4,012,067 A | 3/1977 | Travis | |
| 4,103,953 A * | 8/1978 | Lachance | 294/1.4 |
| 4,146,260 A | 3/1979 | Carrington | |
| 4,335,678 A | 6/1982 | Garza | |
| 4,852,924 A | 8/1989 | Ines | |
| 5,634,678 A * | 6/1997 | Bailey | 294/1.5 |
| 5,676,411 A | 10/1997 | Kwok | |
| 5,683,129 A | 11/1997 | Jensen | |
| 5,971,452 A | 10/1999 | Marymore | |
| 6,123,046 A | 9/2000 | Gemeniano | |
| 6,149,214 A | 11/2000 | Kipka | |
| 6,158,395 A | 12/2000 | Bauklon | |
| 6,164,710 A | 12/2000 | Shibuya | |
| 6,386,605 B1 | 5/2002 | Kaplan | |
| 6,702,349 B2 | 3/2004 | Clements | |
| 6,942,264 B1 * | 9/2005 | Mendez | 294/1.5 |

* cited by examiner

*Primary Examiner*—Dean J. Kramer

(57) ABSTRACT

A new, unique, lightweight and compact dog waste-collection device and bag disposal system is disclosed for the sanitary and convenient capture and disposal of dog waste comprised of a telescoping plastic handle and a collection bag rim which can be easily transformed from the closed "carry" position 120 degrees to the open "working" position. A new, specific, disposable, 100% biodegradable and 100% compostable waste-collection bag which is quickly and easily affixed to the device by sliding a hole in the bag down and around the device's handle, pushing the bag through the inside of the collection bag rim allowing the top 2" or so of the bag to fold over the collection bag rim. The device is positioned behind an eliminating dog and catches the waste before it hits the ground. The bag is removed with a simple downward pull and disposed of in an environmentally-responsible manner.

1 Claim, 4 Drawing Sheets

OPEN AND EXTENDED POSITION FOR USING DEVICE
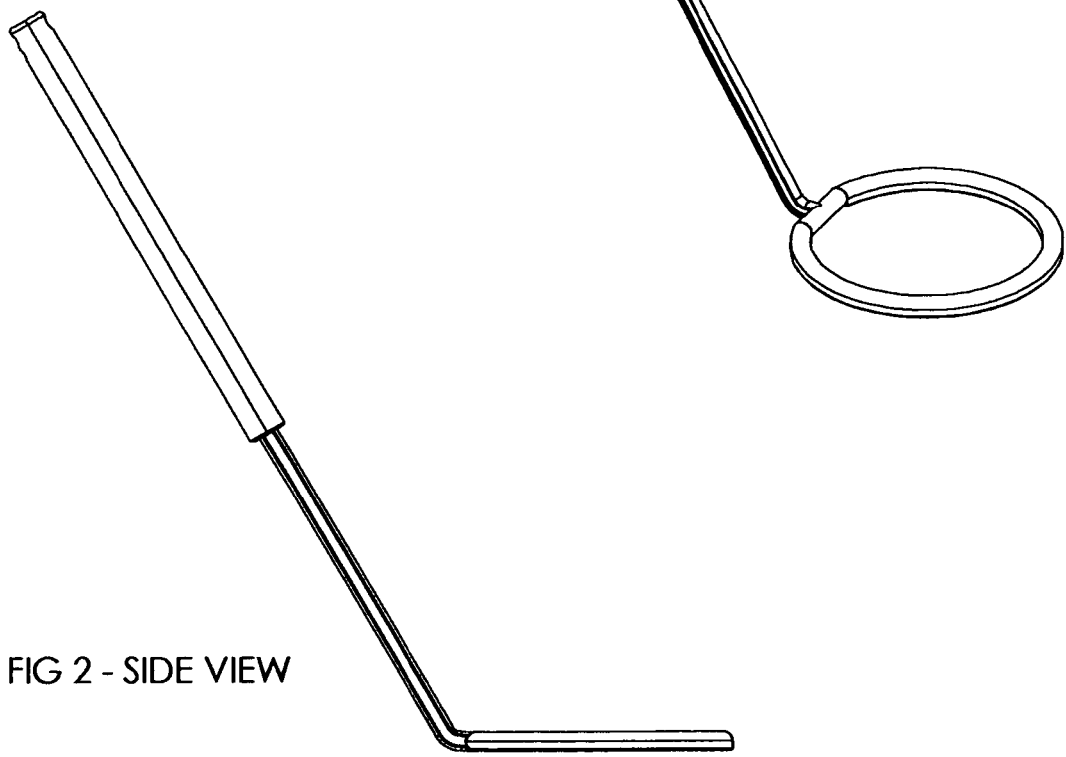
FIG 1 - PERSPECTIVE VIEW
FIG 2 - SIDE VIEW

ALTERNATE POSITION FOR STORAGE AND CARRYING DEVICE
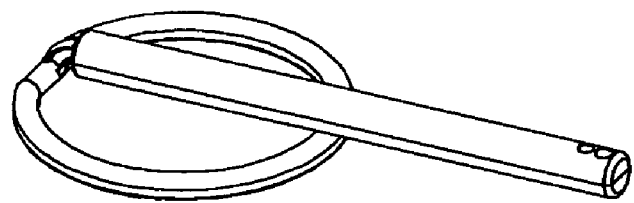
FIG 3 - PERSPECTIVE VIEW
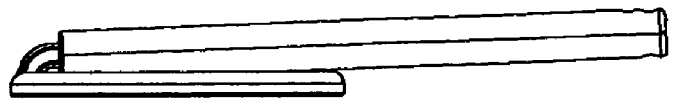
FIG 4 - SIDE VIEW

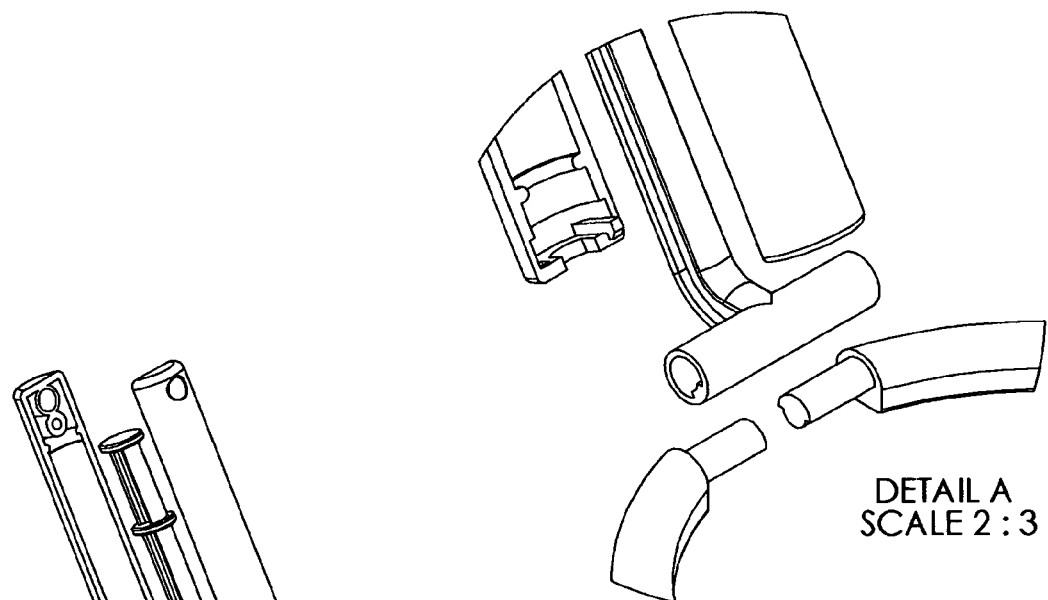
DETAIL A
SCALE 2 : 3
FIG 5 - CLOSE-UP EXPLODED
PERSPECTIVE VIEW
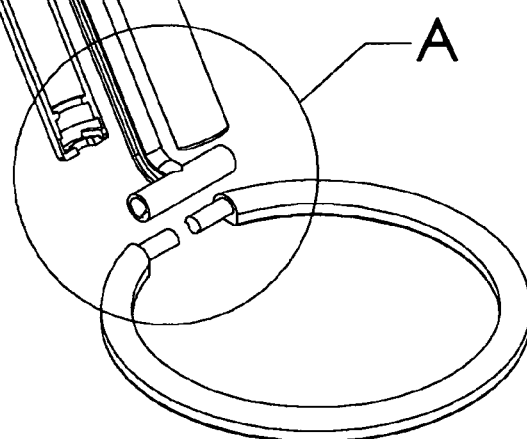
A
FIG 6 - EXPLODED PERSPECTIVE VIEW

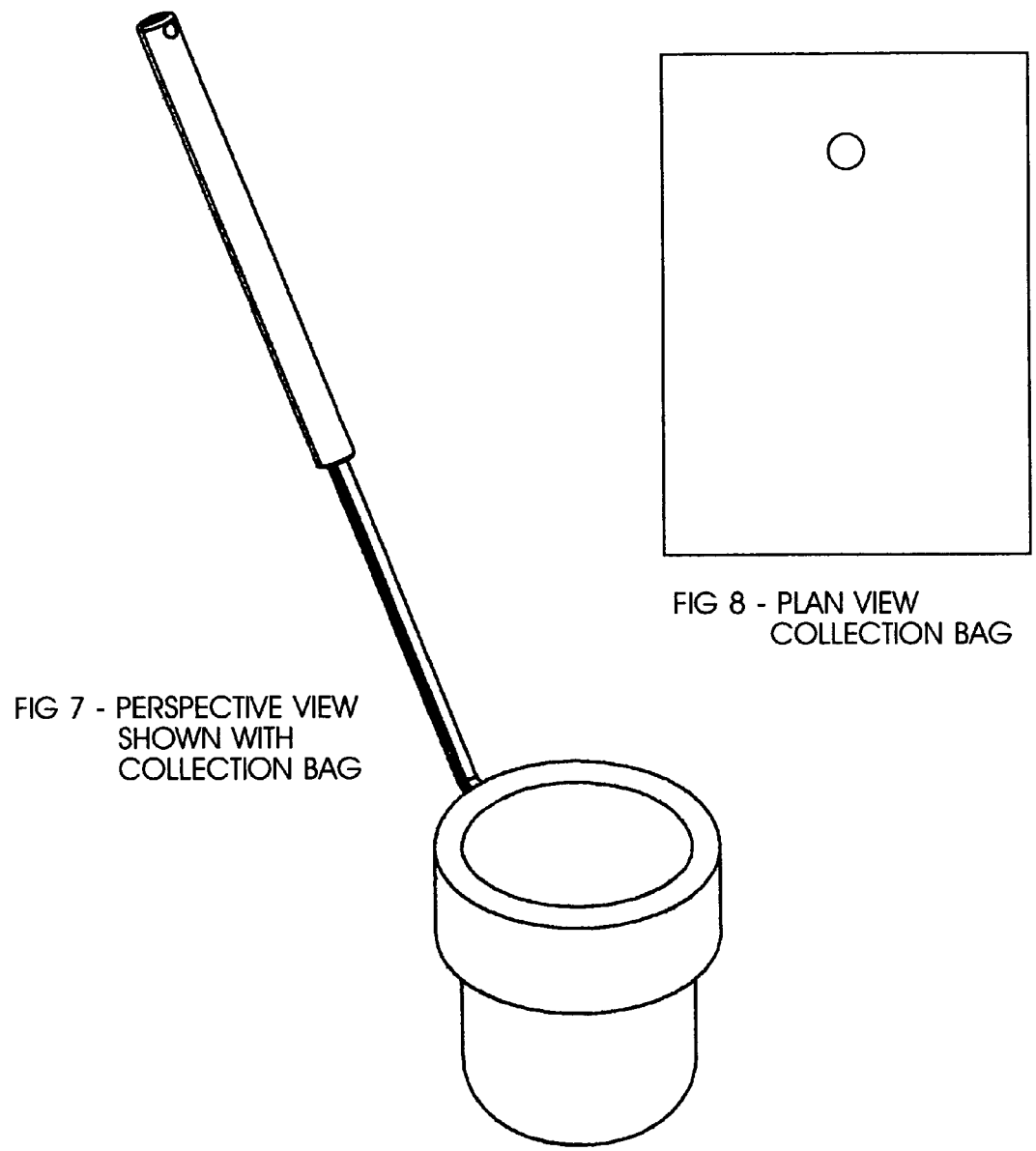
FIG 7 - PERSPECTIVE VIEW SHOWN WITH COLLECTION BAG
FIG 8 - PLAN VIEW COLLECTION BAG

DOG WASTE-COLLECTION DEVICE AND BAG DISPOSAL SYSTEM

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING A TABLE, OR A COMPUTER PROGRAM LISTING COMPACT DISK APPENDIX

Not Applicable

BACKGROUND OF THE INVENTION

In most jurisdictions it is the duty of the dog's walker (hereinafter referred to as "the walker") to clean up his/her dog's fecal waste (hereinafter referred to as "the waste") after his/her dog eliminates in public areas. The chore is universally regarded as totally disgusting and highly undignified. This invention relates to a new, specific, plastic waste-collection device which, along with a new, specific, disposable bag combines to form a unique disposal system designed specifically for the simple, quick, non-mechanical, user-friendly affixing and removal of said bag to said device for the easy and sanitary collection and environmentally-responsible disposal of the waste.

For decades inventors have been developing devices in attempts to make the chore less of an embarrassing burden with the hopes that more and more people will embrace their civic duty. A number of inventions in the Prior Art have produced a variety of designs, respectively, which feature some sort of non-specific, waste-collection bag attached in some fashion to a frame which in turn is attached to a handle. While some of the Prior Art may theoretically "work", the respective devices all have at least one or more drawbacks in that they are: not hygienic, not user-friendly, awkward, cumbersome, too large or too heavy to carry, or too expensive to manufacture and market. None of the Prior Art has produced a simple, lightweight, compact, easy to carry, user-friendly, hygienic device which is feasible, cost-effective to manufacture and therefore affordable for the consumer to purchase.

U.S. Pat. No. 3,744,453 to Dietch and U.S. Pat. No. 3,872,831 to Cassidy are the original, related dog waste-collection devices from which the devices which are discussed below have followed.

U.S. Pat. No. 4,012,067 to Travis discloses a device in which the waste-collection bag must be mechanically attached to and detached from the device by utilization of a clamp. This arrangement is not user-friendly for bag installation and removal. Further, the design does not provide for the hygienic protection of the device during elimination. Additionally, the Travis device does not fold up, is not easy to carry and its design does not provide for the user-friendly presentation of the device to an eliminating dog.

U.S. Pat. No. 4,146,260 to Carrington discloses a device in which the waste-collection bag is attached to the device by an elastic fitting that must be adjusted and maneuvered for both installation and removal thus making bag installation and removal a chore in itself. The Carrington design is not hygienic in that it offers the walker the option of picking up waste by scraping its steel band against the waste. The Carrington device neither telescopes nor folds up making carry difficult and long walks tiring.

U.S. Pat. No. 4,335,678 to Garza discloses a device which requires a combination of manual and mechanical parts to thread and unthread a drawstring of a waste-collection bag to attach and detach the bag in a most non-user-friendly manner. This is a very heavy device that neither telescopes nor folds up and is thus difficult to carry. This is a complicated machine that theoretically might work but not a tool which the average walker would want to use.

U.S. Pat. No. 4,852,914 to Ines discloses a device in which the waste-collection bag is attached to the device by a built-in elastic cord which must be hand-stuffed into and all the way around the continuous groove of the device's frame to hold the bag on. The process is reversed for the bag removal. Bag attachment and detachment is not user-friendly. The device is not hygienic in that its circular frame is exposed and vulnerable to waste contamination while a dog eliminates. Furthermore, the longitudinal ribs of the device's telescoping handle lend to the collection and harboring of all manner of particulate and bacteria in between the ribs and their corresponding grooves. This design makes the device prone to potential operating difficulty and provides a place for bacteria to grow.

U.S. Pat. No. 5,676,411 to Kwok discloses a device which is highly mechanical in the nature in which a waste-collection bag is attached to its frame and then released in a time-consuming and non-user-friendly process which involves the use of a clamp. The design is characterized by a multitude of movable parts. The design of the device's wide leading edge makes it difficult for the walker to position the device under an eliminating dog without the device coming into contact with one or both of the dog's hind legs. The grooves in the device's handle are susceptible to the collection of particulate and bacteria. This device is heavy, cumbersome and not easy to carry.

U.S. Pat. No. 5,683,129 to Jensen discloses a material-intensive and parts-intensive, complicated, heavy device which does not fold and which includes an assortment of machined parts which are expensive to manufacture and which in turn makes the device expensive for the consumer to purchase. While Jensen writes variously "[a]bag 18 is carried on the bag holder . . . ", "[t]he bag 18 can be removed from the bag holder . . . " and "[t]he bag holder 14 is a flat annular continuous band 40, to receive the bag 18" he never teaches the reader/user how the bag is attached to and/or maintained onto the flat annular band and detached after use. It is complex, not user-friendly and not easy to carry.

U.S. Pat. No. 5,971,452 to Marymor, et al., which appears could be somewhat lightweight and cost-effective to manufacture, is not user-friendly in that the Marymor device, which is roughly 31" long by 9" wide by 12" deep, is not compactable and is difficult to carry. Furthermore, the walker must attach the waste-collection bag to the Marymor device by means of first inserting one side of the bag into a notch on the device and then drawing the bag across the device's frame before tying the bag's handles in a circuitous figure eight knot around both the device's handle and its peg—a daunting task for many potential walkers.

U.S. Pat. No. 6,123,046 to Gemeniamo discloses another complex device in which a waste-collection bag is, in an around about way, attached to said device by following a 15-step set of instructions dealing with an assortment of parts which include a pair of arms, a pair of legs, a pair of prongs, a pair of eyehooks, all so that a walker can still employ a shovel to scrape dog waste into the bag of said device. One can assume that detaching the bag requires the convoluted process of bag attachment to be reversed. Although the device employs a plastic bag it does not attempt to claim the dog's waste is put into the plastic bag until after the waste has already made contact with the ground.

U.S. Pat. No. 6,149,214 to Kipka discloses a device in which its waste-collection bag is attached by opening two concentric rings, placing the bag between the rings, and then capturing the bag between the two rings by closing them. The device lacks a means to conveniently separate the two rings in order to detach the bag. Because of the design, the Kipka device is not hygienic in that there is no means to protect the top ring of the device from waste contamination and the walker is exposed to waste when separating the two rings so as to detach the bag. Additionally, the design provides for a very awkward angle of user presentation of the device to a dog. The device does not completely fold up, is not lightweight and is not easy to carry. The upper handle is not amenable to hand-gripping.

U.S. Pat. No. 6,158,395 to Bauklon discloses a dog excrement container which utilizes a receptacle bowl and a covering plate. The device requires that the walker remove the covering plate by way of a mechanical lever so as to allow the dog to eliminate into a bag. The device by necessity is heavy, not easy to carry, and not user-friendly, although it appears to be hygienic.

U.S. Pat. No. 6,164,710 to Shibuya discloses a dog waste receptacle device which, from outside to inside is totally vulnerable to waste contamination in that a waste-collection bag is merely placed loose inside the device and not fitted to the device in a manner to prevent waste contamination. The Shibuya device is awkward, cumbersome, heavy and just not practical for a walker to use in that it is more a stationary machine than a portable tool which would be very expensive to produce and purchase.

U.S. Pat. No. 6,386,605 to Kaplan discloses a canine waste-collection device and disposal method that employs a paper towel or other paper product to collect waste. This device and method has obvious disadvantages for dealing with a dog with loose stools. Beyond that, the attachment and detachment of the paper towel is a time-consuming and laborious operation.

U.S. Pat. No. 6,702,349 to Clements discloses a device which is essentially a waste-collection bag on a stick but Clements does not teach or claim how the bag is either attached to or detached from the device. The angle at which the device is presented by the walker to the dog is almost perpendicular to the ground and not at all convenient for either walker or dog. The Clements' device does not telescope or fold up, is not easy to carry and is not hygienic in that there is no provision taught or claimed to protect the device from the waste of an eliminating dog.

The instant invention is distinguished from U.S. Pat. No. 4,103,953 to Lachance in that Lachance shows a bag "having a hem at its top edge extending along the greater part of the length of said top edge and opened at both its ends" whereas the instant invention has a diecut hole through the top of the bag. In Lachance the user must feed the frame through the length of the hem. The same feeding process is reversed to remove the Lachance bag. In the instant invention the hole in the bag is dropped over the device's handle. Removal of the bag in the instant invention requires a downward pull on the bag. The instant invention utilizes a bag that is much easier to manufacture and much easier to install and remove.

U.S. Pat. No. 5,634,678 to Bailey discloses a dog defecate collection device which requires that a part of the device itself, specifically the shape retaining member which supports the bag, be disposed of after each use. This requirement is both costly and time consuming. The spring and latch in Bailey is subject to malfunction which would render the device useless. The instant invention utilizes no shape retaining member which is disposable and no spring or latch which could malfunction.

U.S. Pat. No. 6,942,264 to Mendez discloses a dog defecate collection device which claims a bag with a tie string and elastic material which must be attached to the device by fitting the elastic material portion of the bag along a recess between an upper and lower flange lip. No claim is made regarding how to separate these upper and lower flange lips to remove said bag from the device. The user must come in contact with these flanges to separate them. Handling these flanges exposes the user to risk of contamination by fecal matter. Further, this device is susceptible to malfunction of the necessary tension spring which joins the first and second flanges together and said malfunction could thus render the device useless. The instant device stays clean because the entire hoop is covered by a bag, requires nothing to clamp over the bag to keep the bag in position for use, the bag tears off the device with a simple downward pull and no malfunction would occur during normal use which would render the device useless.

Finally, by virtue of their designs and the manipulations required to separate the waste-collection bags from their respective devices, the walker's face will naturally be drawn somewhat close to dog waste for bag removal in the Prior Art of: U.S. Pat. No. 4,012,067/Travis, U.S. Pat. No. 4,146, 260/Carrington, U.S. Pat. No. 4,852,914/Ines, U.S. Pat. No. 5,683,129/Jensen, U.S. Pat. No. 5,971,452/Marymor, U.S. Pat. No. 6,386,605/Kaplan, and U.S. Pat. No. 6,702,349/ Clements.

Although the cited examples of the Prior Art may or may not "do the trick" in terms of attaching and detaching their respective waste-collection bags or paper product(s) to and from their respective devices, as will be fully disclosed the present invention provides a system for the simple, quick, non-mechanical, user-friendly affixing and removal of its own, specific, disposable waste-collection bag to a new, specific, plastic waste-collection device in a system that protects both the device and walker from waste contamination and is environmentally-responsible.

Embodiments of the Prior Art, when compared to the present invention, are, without exception, larger, heavier, more difficult to carry and not as user-friendly. Furthermore, for one reason or another, embodiments of the Prior Art when compared to the present invention are not as feasible, are more expensive to manufacture and therefore more expensive for the consumer to purchase.

BRIEF SUMMARY OF THE INVENTION

The present invention describes a new, specific, plastic dog waste-collection device (hereinafter "the device") which, when used with a new, specific, disposable, 100% biodegradable and 100% compostable waste-collection bag which meets ASTM Standard D6400-99 (hereinafter "the bag"), provides a user-friendly, hygienic and environmentally-responsible disposal system; and in which said bag can easily and quickly be affixed to said device in such a manner that the device is protected from waste contamination; and in which such device is also lightweight, easy to manipulate and position under an eliminating dog; and in which such device also provides a means to easily, quickly and hygienically remove the bag; and in which such device is readily reduced to a convenient, walk-away and carry size after use; and in which such device is simple, durable, feasible and economical to manufacture and therefore affordable for the consumer to purchase.

The advantages of the device and bag over the Prior Art are many and wide ranging. First, the device is extremely portable and inconspicuous. It is feather light—weighing six (6) ounces. Open, the device is approximately 25" long and 7" wide; folded up it is approximately 13.5" long and 1.5" thick. The device is ideal for senior citizens and dog owners who live in buildings which require the walker to carry the dog in and out. It is difficult enough to carry a dog. It is another matter to carry a large, heavy and/or bulky waste-collection device as well.

Second, it's design is straight-forward and simple. A Handle is comprised of two telescoping parts. A Collection Bag Rim folds against the Handle when not in use. The unique design allows the device to be transformed from the closed "carry" position to the open "working" position easily and quickly. The device is free of any catches, clamps, eye hooks, grooves, latches, notches, pegs, elastic, strings, ties or any other bag connecting devices associated with virtually all of the Prior Art. With the exception of one metal screw the device is 100% plastic.

Another big advantage of the device is the manner in which the bag is affixed to the Collection Bag Rim. The bag has a 1" diameter die cut hole located 1.5" down from the top of the bag. The user simply slips the 1" die cut hole over the top of the Handle, slides the bag down and around the Handle and pushes the bag through the inside of the Collection Bag Rim allowing the top 2" or so of the bag to fold over the outside of the Collection Bag Rim. The bag is thus easily and quickly affixed and ready for use. The 1" die cut hole in the Bag around the Handle, the slight under-sizing of the diameter of bag in relation to the diameter of the Collection Bag Rim, the friction of the bag against the Collection Bag Rim, and the length and drag of the 2" or so of the bag folded over the Collection Bag Rim, all work together to keep the bag in place on the Collection Bag Rim.

The Prior Art is replete with lengthy and often-confusing instructions concerning waste-collection bag attachment. This device and bag system provides simplicity. Most people want simplicity. But to many people, simplicity is an absolute necessity. For example, for those who have arthritis, attaching and detaching a waste-collection bag to some of the Prior Art would have been a monumental task, if not an impossibility. The same can be said for those with poor eyesight. Whether one is challenged in terms of his or her manual dexterity, suffers from arthritis or impaired vision, this invention represents a very significant breakthrough over the Prior Art.

This invention also provides a very simple method for keeping the device clean. Because the bag completely covers the Collection Bag Rim, this device is extremely hygienic. And because the bag is removed from the Collection Bag Rim by a simple downward pull the chore of bag removal is both greatly simplified and speeded up. And, the walker's face remains away from the waste at time of bag removal.

Finally, since the bag meets ASTM Standard D6400-99, the bag is 100% compostable and therefore environmentally-responsible.

The foregoing summarizes the important features of the Dog Waste-Collection Device and Bag Disposal System. One embodiment of the device and bag system will be explained herein. It is understandable that the device and bag system described herein is not limited to the details describing the preferred embodiment. The device and bag system is capable of other embodiments.

Additionally, the words, phrases and terms used herein are descriptive and are not to be regarded as limiting.

Those who are skilled in the art will understand that equivalent devices and bag systems could be developed based on the concept and design disclosed herein and that claims made herein are to be regarded as including such equivalent devices and systems.

It is therefore an object of the present invention to provide a device and bag system which includes a telescoping Handle and a folding Collection Bag Rim.

It is an object of the present invention to provide a device and bag system which includes a device which provides for the quick and easy affixing and removal of a bag without the need of catches, clamps, eye hooks, grooves, latches, notches, pegs, elastic, strings, ties or any other connecting devices associated with virtually all of the Prior Art.

It is an object of the present invention to provide a device and bag system which is hygienic and sanitary.

It is an object of the present invention to provide a device and bag system which provides for the collection of dog waste before it hits the ground.

It is an object of the present invention to provide a device and bag system which is extremely lightweight and of sturdy construction and is compact in size.

It is an object of the present invention to provide a device and bag system which is easily carried.

It is an object of the present invention to provide a device and bag system which is easily converted from its closed "carry" configuration to its open "working" configuration.

It is an object of the present invention to provide a device and bag system which is both efficiently manufactured and affordable to the buying public.

It is an object of the present invention to provide a device and bag system which, when telescoped and open, has a Collection Bag Rim offset from the Handle by a convenient and user-friendly angle of 120 degrees.

It is an object of the present invention to provide a device and bag system which utilizes a 100% compostable bag which will encourage walkers to meet their civic duty to dispose of their dogs' waste in an environmentally-responsible manner.

It is an object of the present invention to provide a device and bag system which has all of the advantages of the Prior Art and none of the disadvantages.

It is an object of the present invention to provide a device and bag system which provides benefits not present in any of the Prior Art.

BRIEF DESCRIPTION OF THE SEVERAL VIEWS OF THE DRAWINGS

FIG. 1. is a perspective view of the typical embodiment of the device in the open "working" position.

FIG. 2. is a side view of the typical embodiment of the device in the open "working" position.

FIG. 3. is a perspective view of the embodiment of the device in the closed "carry" position.

FIG. 4. is a side view of the embodiment of the device in the closed "carry" position.

FIG. 5. is a close-up exploded perspective view of part of the Collection Bag Rim, part of the lower end of the telescoping Lower Handle part and parts of the lower ends of the telescoping Upper Handle part.

FIG. 6. is an exploded perspective view of the entire Collection Bag Rim, the entire telescoping Lower Handle part and the entire telescoping Upper Handle parts.

FIG. 7. is a perspective view of the device in the open "working" position with a bag affixed to the Collection Bag Rim.

FIG. 8. is a plan view of the bag showing the die cut hole.

DETAILED DESCRIPTION OF THE INVENTION

FIGS. 1. and 2. offer perspective and side views of the typical embodiment of the device, respectively, in the open "working" position. The device in the open position is 25" long. The diameter of the Collection Bag Rim is 7". The device weighs six (6) ounces. The device is manufactured utilizing the injection molding process. The device is comprised of two pieces which fit together to form the telescoping Upper Handle part, a one-piece telescoping Lower Handle part with integral tee, a one-piece Collection Bag Rim, and one metal pan head screw.

FIGS. 3. and 4. offer perspective and side views of the typical embodiment of the device, respectively, in the closed "carry" position. The device in the closed position is 13.5" long. The thickness of the device in the closed position is 1.5".

FIGS. 5. and 6. offer a close-up exploded perspective and an exploded perspective view, respectively, of the device and are to be viewed and discussed together.

The telescoping Upper Handle part is injection molded in two split-tubular, longitudinal pieces with each piece being 12.5" long, 1" in diameter and 0.125" thick; each of said pieces being equipped with cooperating parts of a snap-lock assembly at the bottoms of said pieces of the telescoping Upper Handle part, respectively; with a pan head screw countersink hole located at the top of one piece of the said telescoping Upper Handle part and a standing boss at the top of the other piece of said part; said Upper Handle part is equipped with a 0.375" diameter thru hole at the top.

The telescoping Lower Handle part is injection molded in one piece, said Lower Handle part consisting of a straight section 11.5" long, having two distinct integral guide/slide spacer rings 1.5" apart located at the top end of said Lower Handle part each having a diameter of 0.74" and a thickness of 0.125"; a 120 degree elbow section having an interior arc 0.75" long; in which both of said sections are of an I-bar profile being 0.375" wide, 0.5" tall and 0.125" thick; with the elbow section intersecting with a tubular tee section, said tubular tee section having a diameter of 0.5", being 2" long and 0.125" thick; said tubular tee section having a female positional socket 0.75" long and with offset concentric radii of 0.18" and 0.125", respectively, on both ends of, and interior to, said tubular tee section.

The Collection Bag Rim is injection molded in tubular fashion utilizing reinforcing webs and having the profile of an upside down "u" thus having a rounded top, straight sidewalls and an open bottom, and having a diameter of 0.5" and a thickness of 0.09"; said Collection Bag Rim being configured in a circle, having a diameter of 7" with a break in said Collection Bag Rim of 0.48"; with a solid male positional lug 0.75" long and with offset concentric radii of 0.18" and 0.125", respectively, on both ends of said Collection Bag Rim break; said male positional lugs configured to insert into the corresponding female positional sockets in the tubular tee section of the device's telescoping Lower Handle part, thus allowing for a range of motion of 120 degrees and providing for the Collection. Bag Rim to rotate from the closed "carry" position to the open "working" position.

In the typical embodiment the device is made entirely of glass filled polypropylene with the exception of one small metal pan head screw. In the typical embodiment the device is manufactured using injection molding processes.

After injection molding of the parts, the device is assembled as follows:

The telescoping Lower Handle part is inserted inside both pieces of the tubular telescoping Upper Handle part. The two pieces of said tubular telescoping Upper Handle part are united by the integral snap-lock assembly and the metal pan head screw into the standing boss.

The Lower Handle part is thus captured inside the Upper Handle part allowing the Lower Handle part to travel nine inches and thus "telescope".

The Collection Bag Rim is manually spread sufficiently at its break to allow for the insertion of said Collection Bag Rim's male positional lugs into their corresponding female positional sockets in the telescoping Lower Handle part's tubular tee section.

The device is thus fully assembled and ready for use with its bag. The bag is 100% biodegradable and 100% compostable and meets ASTM Standard D6400-99. The bag is 10.5" wide, 12" deep with a 1" die cut hole located 1.5" down from its open top.

FIG. 7. shows the bag affixed to the device.

Before walking the dog the walker opens the device and simply slips the 1" die cut hole in the bag over the top of the Handle, slides the bag down and around the Handle and pushes the bag through the inside of the Collection Bag Rim allowing the top 2" or so of the bag to fold over the outside of the Collection Bag Rim. The bag is thus easily and quickly affixed and ready for use. The 1" die cut hole in the bag around the Handle, the slight under-sizing of the diameter of bag in relation to the diameter of the Collection Bag Rim, the friction of the bag against the Collection Bag Rim, and the length and drag of the 2" or so of the bag folded over the Collection Bag Rim, all work together to keep the bag in place on the Collection Bag Rim. The walker then closes the device and walks the dog.

When the dog prepares to eliminate the walker opens the device and maneuvers the device behind the dog. In this manner the walker is able to collect the dog's waste before it hits the ground. Following elimination the walker removes the bag with a downward pull, closes the device and continues the walk and properly disposes of the 100% biodegradable and 100% compostable bag in an environmentally-responsible manner.

We claim:

1. A dog waste-collection device and bag disposal system comprising:
   a. a telescoping upper handle part having two split-tubular, longitudinal pieces with said pieces being held together by a means and with said telescoping upper handle part having a thru hole at the top end; and
   b. a telescoping lower handle part having two distinct integral guide/slide spacer rings at a top end and an elbow-tee at a bottom end with said elbow-tee having a female positional socket with offset concentric radii on each end of said elbow-tee, said telescoping lower handle part to be slideable inside said telescoping upper handle part, so as to allow for said telescoping lower handle part to slide within said telescoping upper handle part from a closed carry position to an open working position with a downward flick of the wrist; and c. a circular collection bag rim with a break in said collection bag rim, having a male positional lug with offset concentric radii on each end of said break with each said male positional lug being insertable into each said corresponding female positional socket on each end of said elbow-tee of said telescoping lower handle part, so as to provide for said collection bag rim to pivot from the closed carry position to the open working position with a downward flick of the wrist; and d. a bag with a die-cut hole located near the open end of said bag, said bag being affixed to said device by slipping said die cut hole on one side of said bag over the top of said telescoping upper handle part and sliding said bag down said telescoping upper handle part to said elbow-tee of said telescoping lower handle part, then pushing the bottom of said bag through the inside of said collection bag rim and folding the top of said bag over the outside of entire said collection bag rim, said bag being held in place on said collection bag rim by said die-cut hole of said bag around said elbow-tee of said telescoping lower handle part, and the slight under-sizing of the diameter of said bag in relation to the diameter of said collection bag rim, and the length and drag of the top of said bag folded over said collection bag rim, and the friction of said bag against said collection bag rim, with said bag being removed from said device simply and quickly with a downward pull on said bag.

* * * * *